United States Patent [19]

Sebo

[11] 4,330,157

[45] May 18, 1982

[54] MODULAR CONTROL VALVE

[75] Inventor: Milan J. Sebo, Lorain, Ohio

[73] Assignee: The Bendix Corporation, Southfield, Mich.

[21] Appl. No.: 124,386

[22] Filed: Feb. 25, 1980

[51] Int. Cl.³ .............................................. B60T 15/04
[52] U.S. Cl. .......................................... 303/7; 303/50; 303/71
[58] Field of Search ..................... 303/50-56, 303/71, 7, 9, 13, 6 A, 6 M, 63, 64, 70, 29; 188/170

[56] References Cited

U.S. PATENT DOCUMENTS 4,163,584  8/1979  Koenig ..................................... 303/7
4,232,908 11/1980  Stearns ............................. 303/71 X

*Primary Examiner*—Douglas C. Butler

*Attorney, Agent, or Firm*—Ken C. Decker; William N. Antonis

[57] ABSTRACT

A braking system for a tractor-trailer combination vehicle having air brakes includes a two plunger control valve in which one of the plungers controls the brakes on the tractor and the other plunger controls the brakes on the trailer. However, the valve is designed such that actuation of the plunger controlling the brakes on the tractor to a condition effecting an application of the spring brakes on the tractor automatically actuates the other plunger to effect an automatic actuation of the spring brakes on the trailer. Operation of the plunger controlling the trailer brakes is independent of the plunger controlling the tractor brakes, so that application of the trailer spring brakes may be effected without applying the tractor spring brakes. The tractor spring brakes may be released with the trailer brakes applied to permit bobtail tractor operation or permit the trailer to be parked with the tractor spring brakes released.

8 Claims, 1 Drawing Figure

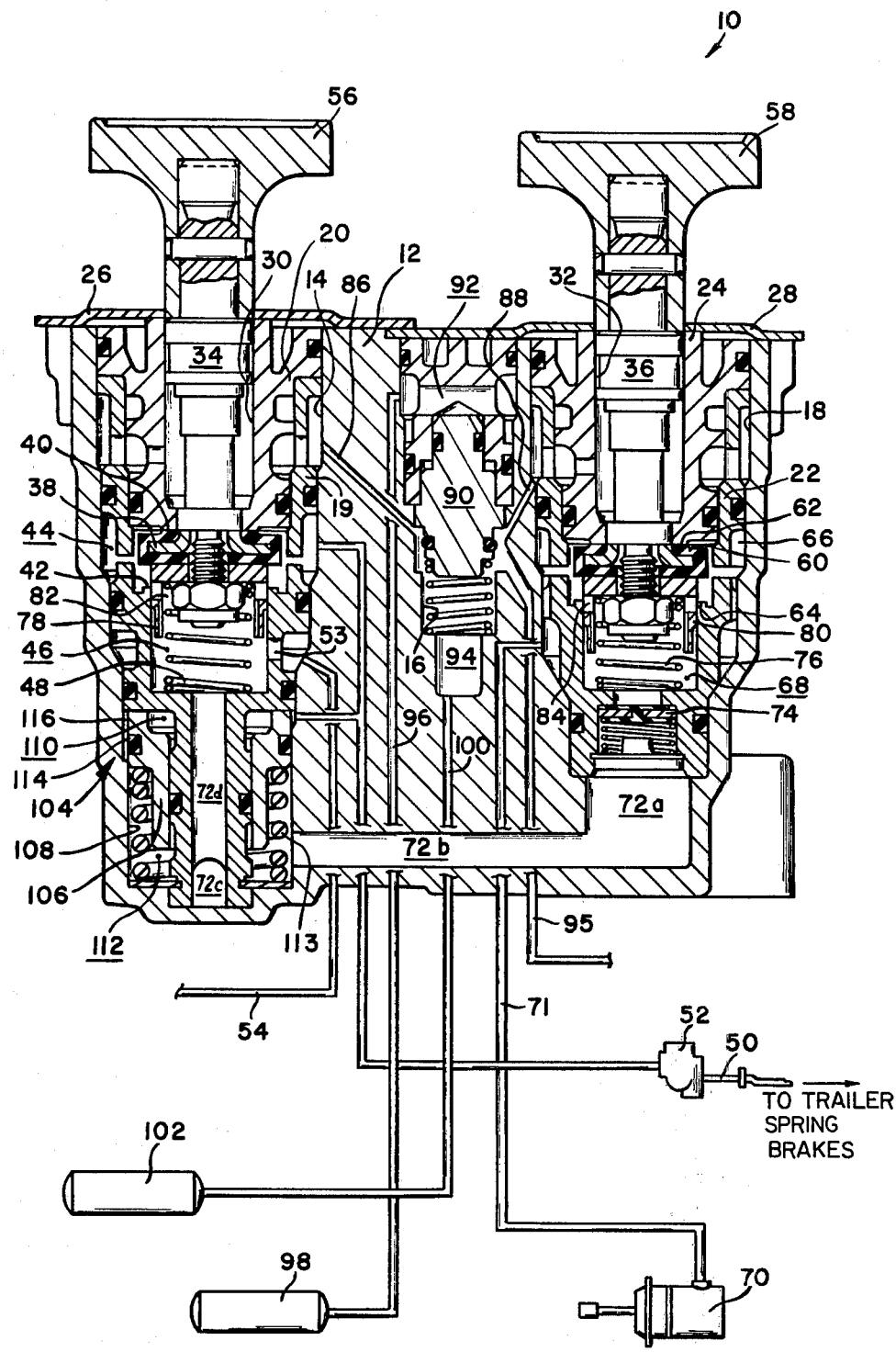

MODULAR CONTROL VALVE

BACKGROUND OF THE INVENTION

This invention relates to a control valve for the braking system of a tractor-trailer combination vehicle having air brakes.

Existing Federal braking regulations require that tractor-trailer combination vehicles be equipped with air brakes and that both the tractor and the trailer be equipped with spring-applied, fluid pressure released parking brakes, commonly known as "spring brakes". In other words, the spring brakes are released when the vehicle is to be moved by communicating hold-off pressure to the brakes to thereby overcome the force of the spring, and the spring brakes are applied when the vehicle is parked by venting this hold-off pressure, thereby permitting the springs to apply the brakes. Federal regulations further require a single control valve capable of applying the spring brakes on both the tractor and trailer simultaneously and a second control valve capable of controlling the spring brakes on the trailer only. In addition to these two required control valves, it has become customary to provide a third valve that permits the spring brakes on the tractor to be applied while the spring brakes on the trailer are released, to thereby permit charging of the trailer braking system while the tractor spring brakes are applied, and also to permit use of air actuated accessories (such as rear lift gates) while the vehicle is parked with the tractor parking brakes. However, the addition of the third valve, of course, requires additional fluid connections with potential leakage points and also substantially increases the cost of the system. Furthermore, the aforementioned third valve in many such systems may be inadvertently operated while the vehicle is in motion, thereby creating a very dangerous condition with the tractor brakes applied and the trailer brakes released while the vehicle is in motion.

SUMMARY OF THE INVENTION

The present invention provides a control valve having but two valve mechanisms which provide a single control to simultaneously apply the spring brakes on both the tractor and trailer, and which enable the spring brakes on either the tractor or trailer to be independently released. Furthermore, the valve mechanism of the present invention also eliminates the possibility that the tractor brakes alone may be inadvertently applied while the vehicle is in motion.

Therefore, an important object of my invention is to eliminate one of the three valve mechanisms commonly used on existing tractor-trailer combination vehicle parking brake systems.

Another important object of my invention is to permit independent release of the parking brakes on either the tractor or the trailer.

Still another important object of my invention is to prevent inadvertent application of the tractor spring brakes while the vehicle is in motion.

BRIEF DESCRIPTION OF THE DRAWINGS

The sole FIGURE of the drawing is a schematic illustration of a parking brake system for a tractor-trailer combination vehicle, with a valve mechanism made pursuant to the present invention illustrated in cross-section.

DETAILED DESCRIPTION

Referring now to the drawing, a valve assembly generally indicated by the numeral 10 includes a housing 12 defining substantially parallel bores 14, 16, and 18 therewithin. Valve inserts 19, 20 and 22, 24 are received within the bores 14 and 18 respectively and are locked in place by corresponding cover plates 26, 28. The valve inserts 20, 24 define bores 30, 32 respectively which slidably receive corresponding valve plungers 34 and 36. Valve plunger 34 carries a valve element 38 which is engageable with valve seats 40, 42 carried by the inserts 20 and 19 respectively to control communication between the bore 30, an outlet chamber 44, and an exhaust chamber 46. A spring 48 yieldably urges the valve element 38 into sealing engagement with valve seat 40. The outlet chamber 44 is communicated to the trailer supply line 50 (and therefore to the trailer spring brakes, not shown) through a conventional tractor protection valve 52. The exhaust chamber 46 is communicated with ambient atmosphere through aperture 53 and an exhaust line 54. A knob 56 is mounted on the end of the plunger 34 in the cab of the vehicle so that the plunger 34 may be manipulated by the vehicle operator.

The plunger 36 carries a knob 58 similar to the knob 56 carried by the plunger 34. The plunger 36 further carries a valve element 60 which cooperates with valve seats 62 and 64 carried by the inserts 24, 22 respectively to control communication between the bore 32, an outlet chamber 66, and an exhaust chamber 68. Outlet chamber 66 is communicated with the tractor spring brake actuators 70 through supply line 71. A passage 72, comprising portions 72a, 72b, 72c, and 72d communicates the exhaust chamber 68 with the exhaust chamber 46. A one-way check valve 74 permits communication from the exhaust chamber 68 into the passage 72, but prevents communication in the reverse direction. A spring 76, similar to the spring 48, urges the valve element 60 into sealing engagement with the valve seat 62. Each of the plungers 34, 36 carry a guide 78, 80 that is slidably received in the exhaust chambers 46, 68. Each of the guides 78, 80 carries an aperture 82, 84 which communicates the corresponding exhaust chambers 46, 68 with corresponding outlet chambers 44, 66 when the plungers 34, 36 are in the positions illustrated in the drawings. When the plunger 34 is moved downwardly viewing the drawing to engage the valve element 38 with the valve seat 42, valve guide 78 restricts communication between exhaust chamber 46 and aperture 53.

The bores 30, 32 are communicated with the bore 16 through passages generally indicated by the numerals 86 and 88. A spring loaded shuttle 90 is slidably mounted in the bore 16 dividing the latter into sections 92, 94 between opposite ends of the shuttle and corresponding ends of the bore 16. A passage 96 communicates section 92 of bore 16 with a first fluid pressure reservoir 98 and a passage 100 communicates the other section 94 of the bore 16 to a second fluid pressure reservoir 102. The shuttle 90 is made pursuant to the teachings of co-pending U.S. patent application Ser. No. 94,847, filed Nov. 16, 1979, owned by the assignee of the present invention and incorporated herein by reference. As disclosed in this prior application, the shuttle 90 is effective to communicate the passages 86, 88 to the section 94 of bore 16 as long as the pressure in the reservoir 102 is greater than the pressure in reservoir 98 by a predetermined amount. However, when the pressure in reservoir 102 drops below the pressure level in reservoir 98 by more than the predetermined amount, the shuttle 90 shifts to communicate the passages 86, 88 with the section 92. A conduit 95 communicates the passages 86, 88 with accessory air actuated devices (not shown).

The valve assembly including the valve plunger 34 is provided with a mechanism generally indicated by the numeral 104 to prevent the valve plunger 34 from being overridden when a leak causes pressure in the trailer supply line 50 to drop. Mechanism 104 includes a piston 106 slidably mounted in portion 108 of the bore 14. The piston 106 divides the portion 108 into a pair of chambers 110, 112 between opposite ends of the piston 106 and corresponding ends of the bore 108. Chamber 112 is communicated with exhaust line 54 through passages 72c, 72d and the exhaust chamber 46. The chamber 110 is communicated to the trailer supply line 50. A spring 113 yieldably urges the piston 106 upwardly viewing the FIGURE, into the chamber 110. The piston 106 carries a seal 114 which is adapted to sealingly engage the wall of the portion 108. However, the wall of portion 108 includes an enlarged portion generally indicated by the numeral 116. When the piston seal 114 is disposed in the portion 116, the chambers 110 and 112 are communicated with one another. When the pressure in trailer supply line 50 is above a predetermined level, this pressure level in chamber 110 acting on the piston 106 urges the latter downwardly viewing the FIGURE, against the force of the spring 113 to thereby bring the seal 114 into sealing engagement with the portion 108 of the bore 14. Accordingly, communication is cut off between the chambers 110 and 112. However, when the pressure in the trailer supply line 50 drops below a predetermined level, the spring 113 urges the piston 106 upwardly viewing the FIGURE, thereby communicating chambers 110 and 112 to communicate the trailer supply line 50 with atmosphere through passages 72c, 72d and exhaust chamber 46. In this way, even if the vehicle operator manually holds the plunger 34 in a position such that valve element 38 engages with valve seat 42, the air pressure which would otherwise be delivered to the trailer supply line 50 is instead vented to atmosphere because of the connection between chambers 110 and 112. In this way, it is impossible for the vehicle operator to charge the spring brakes on the trailer when there is a leak in the system.

MODE OF OPERATION

The various components of the control valve 10 are illustrated in the drawing in the position which they assume when the vehicle is parked and the spring brakes are applied. In this condition, the valve element 38 is disposed in sealing engagement with the valve seat 40, thereby venting the trailer supply line 50 to atmosphere through the outlet chamber 44, aperture 82, exhaust chamber 46, aperture 53 and the exhaust line 54. Similarly, the valve element 60 carried by valve plunger 36 is disposed in sealing engagement with the valve seat 62, thereby venting the spring brakes 70 on the tractor to atmosphere through the outlet chamber 66, the exhaust chamber 68, the one-way check valve 74, the passage 72, the exhaust chamber 46, and the exhaust line 54. When the spring brakes are to be charged with air so that the vehicle can be moved, the valve plungers 34 and 36 are moved downwardly viewing the FIGURE by manual manipulation of the knobs 56 and 58. When this occurs, the valve element 38 is brought into sealing engagement with the valve seat 42, thereby communicating high pressure air from the reservoir 102 (when the shuttle 90 is disposed in the position illustrated in the drawing) through the passage 86, the bore 14, the bore 30, the outlet chamber 44, and the trailer supply line 50. Similarly, the valve element 60 associated with valve plunger 36 is moved into sealing engagement with the valve seat 64, thereby communicating high pressure air to the spring brake actuators 70 through passage 88, bore 18, bore 32, the outlet chamber 66 and line 71. Due to the high pressure air acting on the upper surface of the valve elements 38 and 60, the latter are maintained into sealing engagement with the corresponding valve seats 42, 64 after the plungers are initially actuated, unless the force of fluid pressure acting on the valve element 38, 60 decreases to a force less than that exerted on the plungers by the springs 48, 76. This can occur due to a simultaneous leak in both of the reservoirs 102 and 98, in which case the springs 48 and 76 urge the plungers 34 and 36 into the position illustrated in the drawing, thereby venting the supply lines 50 and 71 to effect an automatic application of the tractor and trailer spring brakes.

The spring brakes on both the tractor and trailer are applied simultaneously by manual movement of the plunger 36 upwardly viewing the FIGURE into the position illustrated in the drawing. When this occurs, the pressure in spring brake actuators 70 is vented through line 71, outlet chamber 66, exhaust chamber 68, through one-way check valve 74 into passage 72, and from passage 72 into the exhaust chamber 46. Since the valve plunger 34 is disposed in its downward (viewing the FIGURE) position in which the aperture 53 is covered, the path to the exhaust line 54 is restricted by the guide 78. As the pressure level increases in the chamber 46 due to the venting of the spring brake actuators 70, the fluid pressure acting upon the fluid pressure responsive surface of the valve element 38 exerts a force on the plunger 34 urging the latter upwardly viewing the FIGURE. When this occurs, the valve element 38 is forced out of sealing engagement with the valve seat 42, thereby venting the outlet chamber 44, and therefore the trailer supply line 50, to the exhaust chamber 46 and therefore to the exhaust line 54. Accordingly, since actuation of the plunger 36 to vent the spring brakes 70 on the tractor automatically actuates the plunger 34 to vent the trailer supply line 50 and therefore apply the spring brakes on the trailer, inadvertent application of tractor only spring brakes is prevented. After the spring brakes on the tractor and trailer are applied simultaneously by operation of the plunger 36, the trailer brakes may be released while the tractor spring brakes remain applied by moving the plunger 34 downwardly viewing the FIGURE to communicate air pressure to the trailer supply line 50. The plunger 36 remains in the upward position illustrated in the drawing. After application of the brakes by operation of plunger 36 the spring brakes on the tractor may be released while the trailer brake remains applied by moving the plunger 36 downwardly viewing the FIGURE. In this condition, the spring brakes 70 on the tractor are charged with air to release them, since the valve element 60 is moved into engagement with the valve seat 64, but the trailer supply line 50 is closed and vented because the plunger 34 is disposed in the position illustrated in the drawing. This provides for operation of the tractor in the bobtail mode (without trailer).

I claim:

1. In a fluid pressure braking system for a vehicle having a fluid pressure source, and first and second sets of parking brakes, control mechanism comprising a pair of valves, each of said valves being operable to communicate a pressure signal from said source to a corresponding set of said parking brakes to effect release of said parking brakes and having an inlet port communicated with said pressure source, an outlet port communicated to a corresponding one of said sets of parking brakes, an exhaust chamber, a valve plunger for controlling communication between said ports and the exhaust chamber, the exhaust chamber of each of said valves being communicated to a common exhaust port, the valve plunger of one of said valves being responsive to the pressure in the exhaust chamber of the other valve to move to a position communicating the outlet port of said one valve with said exhaust port, said exhaust chamber of said one valve being communicated to the exhaust chamber of the other valve, and a check valve controlling communication between said exhaust chambers, said check valve permitting communication from said exhaust chamber of said other valve into the exhaust chamber of said one valve, but preventing communication in the reverse direction.

2. The fluid pressure braking system of claim 1, wherein:
said valve plunger of said one valve includes means restricting communication from the exhaust chamber of said one valve to said exhaust port when the last-mentioned valve plunger is in a position permitting communication between the inlet port and the outlet port of said one valve.

3. The fluid pressure braking system of claim 2, wherein:
said valve plunger of said one valve includes a fluid pressure responsive surface exposed to the fluid pressure level in the corresponding exhaust chamber, said other valve increasing the pressure level in the exhaust chamber of said other valve when the plunger of said other valve is moved to a condition communicating the corresponding outlet port and exhaust chamber, said increased pressure level in the exhaust chamber of said other valve being communicated past said check valve to the exhaust chamber of said one valve wherein the increased pressure level acts on said fluid pressure responsive surface to force said valve plunger of said one valve to a position blocking communication between the inlet and outlet ports.

4. The fluid pressure braking of claim 1, wherein:
said one valve includes a housing defining a bore therewithin, said bore defining said exhaust chamber of said one valve, said exhaust port being a passage communicating with an aperture in the wall of said bore, said valve plunger of said one valve including a portion slidably in said bore to restrict communication through said aperture when the valve plunger of said one valve is in a position permitting communication between the inlet port and the outlet port of said one valve.

5. The fluid pressure braking system of claim 1, wherein:
the plunger of each of said valve means is shiftable from a first condition communicating the inlet of each valve with its corresponding outlet to a second condition in which communication between the inlet and outlet is prevented and the outlet is vented to the corresponding exhaust chamber thereby causing the pressure level in the corresponding exhaust chamber to increase, said check valve permitting said increase in pressure in the exhaust chamber of said other valve when the latter is moved to said second condition to communicate with the exhaust chamber of said one valve, the plunger of said one valve having a fluid pressure responsive surface exposed to the pressure level in its corresponding exhaust chamber, said surface being responsive to the increase in pressure in the exhaust chambers when the plunger of said other valve is moved from the first to the second condition to move said one valve from the first condition to the second condition.

6. The fluid pressure braking system of claim 5 wherein:
said one valve includes a housing defining a bore therewithin, said bore defining said exhaust chamber of said one valve, said exhaust port being a passage communicating with an aperture in the wall of said bore, said valve plunger of said one valve including a portion slidably in said bore to restrict communication through said aperture when the valve plunger of said one valve is in a position permitting communication between the inlet port and outlet port of said one valve.

7. The fluid pressure braking system of claim 1 wherein:
the plunger of each of said valves is shiftable from a first condition communicating the inlet of each valve with it corresponding outlet to a second condition in which communication between the inlet and outlet is prevented and the outlet is vented to the corresponding exhaust chamber thereby causing the pressure level in the corresponding exhaust chamber to increase, said check valve permitting said increase in pressure in the exhaust chamber of said other valve when the latter is moved to said second condition to communicate with the exhaust chamber of said one valve, the plunger of said one valve having a fluid pressure responsive surface exposed to the pressure level in its corresponding exhaust chamber, said surface being responsive to the increase in pressure in the exhaust chambers when the plunger of said other valve is moved from the first to the second condition to move said one valve from the first condition to the second condition.

8. The fluid pressure braking system of claim 7 wherein:
said one valve includes a housing defining a bore therewithin, said bore defining said exhaust chamber of said one valve, said exhaust port being a passage communicating with an aperture in the wall of said bore, said valve plunger of said one valve including a portion slidably in said bore to restrict communication through said aperture when the valve plunger of said one valve is in a position permitting communication between the inlet port and outlet port of said one valve.

* * * * *